United States Patent
Autry et al.

(10) Patent No.: US 10,315,366 B2
(45) Date of Patent: Jun. 11, 2019

(54) APPARATUSES AND METHODS FOR MAKING REINFORCEMENT STRUCTURES

(71) Applicant: Gulfstream Aerospace Corporation, Savannah, GA (US)

(72) Inventors: Brenden Autry, Savannah, GA (US); Charles Aitken, Savannah, GA (US); John McGuire, Savannah, GA (US); Michael McKee, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 282 days.

(21) Appl. No.: 14/824,290

(22) Filed: Aug. 12, 2015

(65) Prior Publication Data
US 2016/0332393 A1   Nov. 17, 2016

Related U.S. Application Data

(60) Provisional application No. 62/159,459, filed on May 11, 2015.

(51) Int. Cl.
| | |
|---|---|
| *B29C 70/34* | (2006.01) |
| *B29C 70/44* | (2006.01) |
| *B29K 105/08* | (2006.01) |
| *B29L 31/30* | (2006.01) |

(52) U.S. Cl.
CPC ............ *B29C 70/342* (2013.01); *B29C 70/44* (2013.01); *B29C 70/446* (2013.01);
(Continued)

(58) Field of Classification Search
None
See application file for complete search history.

(56) References Cited

U.S. PATENT DOCUMENTS

| | | | | |
|---|---|---|---|---|
| 5,814,268 A | * | 9/1998 | Banchelin | .............. A63B 53/10 |
| | | | | 156/156 |
| 8,800,953 B2 | * | 8/2014 | Morris | .................. B29C 33/485 |
| | | | | 156/156 |

(Continued)

FOREIGN PATENT DOCUMENTS

| | | |
|---|---|---|
| CN | 104177110 A | 12/2014 |
| DE | 1275279 B | 8/1968 |

(Continued)

OTHER PUBLICATIONS

German Patent and Trademark Office, German Search Report in Application No. DE 10 2016 108 505.7, dated Nov. 18, 2016.

(Continued)

*Primary Examiner* — Jacob T Minskey
*Assistant Examiner* — Baileigh Kate Darnell
(74) *Attorney, Agent, or Firm* — LKGlobal | Lorenz & Kopf, LLP

(57) ABSTRACT

Apparatuses and methods for making reinforcement structures are provided. In one example, an apparatus for making a reinforcement structure includes a rigid mandrel and a flexible bladder. The flexible bladder at least partially surrounds the rigid mandrel for supporting a reinforcement structure-forming material during fabrication of the reinforcement structure. The flexible bladder is configured to apply a force to the reinforcement structure-forming material in a direction opposite the rigid mandrel in response to a pressure differential between inside and outside of the flexible bladder.

17 Claims, 7 Drawing Sheets

(52) U.S. Cl.
CPC .............. *B29K 2105/0872* (2013.01); *B29L 2031/3076* (2013.01); *Y02T 50/43* (2013.01)

(56) References Cited

U.S. PATENT DOCUMENTS

| | | | | |
|---|---|---|---|---|
| 2010/0044912 | A1* | 2/2010 | Zahlen | B29C 33/505 264/219 |
| 2010/0139850 | A1* | 6/2010 | Morris | B29C 33/485 156/242 |
| 2011/0127698 | A1* | 6/2011 | Alenby | B29C 70/44 264/510 |
| 2011/0277918 | A1* | 11/2011 | Lee | B29C 33/405 156/156 |
| 2011/0299918 | A1* | 12/2011 | Parker | B29C 45/1418 403/265 |
| 2012/0258276 | A1* | 10/2012 | Modin | B29C 70/342 428/98 |
| 2014/0360657 | A1* | 12/2014 | Murai | B29D 99/0014 156/245 |
| 2016/0214329 | A1* | 7/2016 | Fernandes | B29C 70/34 |

FOREIGN PATENT DOCUMENTS

| | | |
|---|---|---|
| DE | 102008056017 A1 | 5/2010 |
| DE | 102006031336 B4 | 8/2010 |
| EP | 2671709 A1 | 12/2013 |
| EP | 2440395 B1 | 11/2014 |
| FR | 2567805 A1 | 1/1986 |
| GB | 1166604 A | 10/1969 |
| GB | 1513829 | 6/1978 |
| WO | 9851481 | 11/1998 |
| WO | 2008003715 A1 | 1/2008 |
| WO | 2015036940 A1 | 3/2015 |

OTHER PUBLICATIONS

Francisco K. Arakaki, et al. Embraer Composite Material Application, 16th International Conference on Composite Materials, Date Omitted.

Canadian Intellectual Property Office, Official Action for Canadian Patent Application No. 2,926,962 dated Apr. 20, 2018.

The State Intellectual Property Office of the People's Republic of China, First Office Action Issued in Application No. 201610308165.4, dated Jul. 4, 2018.

Canadian Intellectual Propery Office. Office Action in Application No. 2,926,962, dated Dec. 4, 2018.

National Institute of Industrial Property (INPI), Notification of Preliminary Search Report in Application No. FR 1654025, dated Sep. 21, 2018.

\* cited by examiner

APPARATUSES AND METHODS FOR MAKING REINFORCEMENT STRUCTURES

CROSS-REFERENCE TO RELATED APPLICATIONS

This application is related to and claims all available benefit of U.S. Provisional Patent Application 62/159,459 filed May 11, 2015, the entire contents of which are herein incorporated by reference.

TECHNICAL FIELD

The technical field relates generally to reinforcement structures, and more particularly relates to apparatuses and methods for making a reinforcement structure, such as for an aircraft, a motor vehicle, or the like, using a flexible bladder with a rigid mandrel for supporting a reinforcement structure-forming material during fabrication of the reinforcement structure.

BACKGROUND

There are many parts for which reinforcement structures are desired. For example, in the commercial and military transportation industries, aircrafts typically include reinforcement structures configured as or as part of fuselages, ailerons, elevators, rudders, winglets, horizontal tails, wings, empennages, and the like; and automotive vehicles typically include reinforcement structures configured as or as part of vehicle body structures, doors, hoods, pillars, roofs, bumpers, and the like.

Reinforcement structures often include an outer skin(s) and one or more internal features, such as ribs, spars, webs, or the like, that are used to help stiffen and strengthen the reinforcement structure. The internal features are attached to the outer skin(s) or other portion(s) of the reinforcement structure using fixing devices such as metal screws, rivets, bolts, and nuts. Consequently, manufacturing reinforcement structures using such fixing mechanisms is quite time consuming and expensive. In addition, the fixing devices, internal features, and/or other portions of the reinforcement structure are typically made of metal, which adds weight to the reinforcement structure and which does not have the highest strength/stiffness to weigh ratio, such as compared to fiber reinforced composite materials.

Accordingly, it is desirable to provide apparatuses and methods for making a reinforcement structure that are time- and cost-efficient to manufacture. Moreover, it is desirable to provide apparatuses and methods for making a reinforcement structure that is made of a relatively high strength and stiffness but lightweight material. Furthermore, other desirable features and characteristics of the various embodiments described herein will become apparent from the subsequent detailed description and the appended claims, taken in conjunction with the accompanying drawings and this background.

BRIEF SUMMARY

Apparatuses and methods for making reinforcement structures are provided herein. In accordance with an exemplary embodiment, an apparatus for making a reinforcement structure comprises a first rigid mandrel and a first flexible bladder. The first flexible bladder at least partially surrounds the first rigid mandrel for supporting a reinforcement structure-forming material during fabrication of the reinforcement structure. The first flexible bladder is configured to apply a force to the reinforcement structure-forming material in a direction opposite the first rigid mandrel in response to a pressure differential between inside and outside of the first flexible bladder.

In accordance with another exemplary embodiment, a method for making a reinforcement structure is provided. The method comprises the steps of supporting a reinforcement structure-forming material with a first flexible bladder that at least partially surrounds a first rigid mandrel. A pressure differential is produced between inside and outside of the first flexible bladder such that the first flexible bladder applies a force to the reinforcement structure-forming material in a direction opposite the first rigid mandrel.

In accordance with another exemplary embodiment, a method for making a reinforcement structure is provided. The method comprises the steps of positioning a reinforcement structure-forming material between a first flexible bladder that at least partially surrounds a first rigid mandrel and a second flexible bladder that at least partially surrounds a second rigid mandrel. A vacuum condition is produced outside of the first and second flexible bladders such that the first and second flexible bladders compress the reinforcement structure-forming material to facilitate forming an internal feature of the reinforcement structure.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
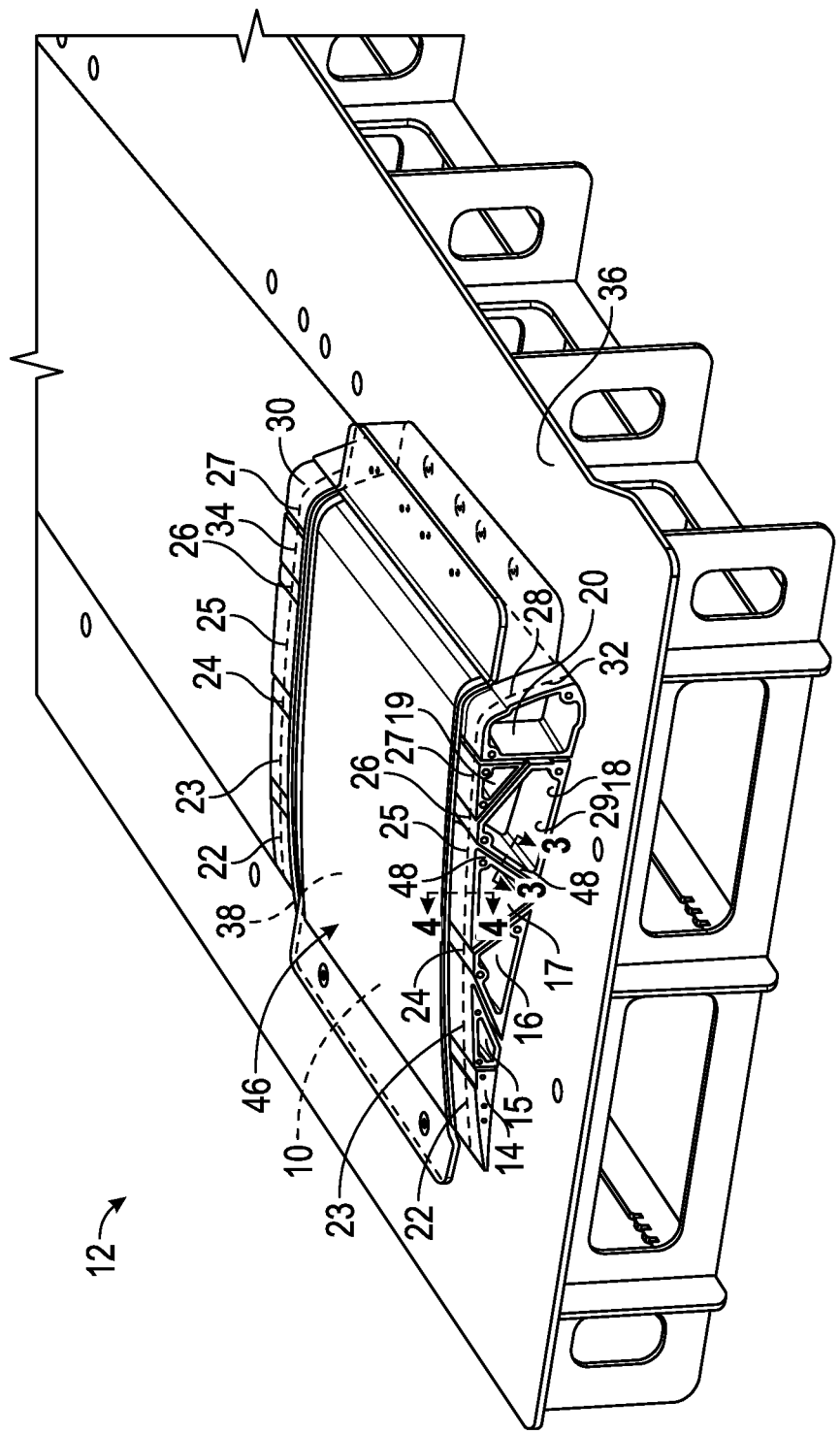
FIGS. 1-2 and 5-8 illustrate, in perspective views, an apparatus and a method for making a reinforcement structure during various intermediate fabrication stages in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses and methods for making reinforcement structures such as for an aircraft, a motor vehicle, or the like. Unlike the prior art, the exemplary embodiments taught herein provide an apparatus that includes a first flexible bladder that at least partially surrounds a first rigid mandrel for supporting a reinforcement structure-forming material during fabrication of a reinforcement structure. In an exemplary embodiment, the reinforcement structure-forming material, in an uncured condition, is relatively flexible and formed of a plurality of plies that are arranged together to form a predefined shape (e.g., intended shape for producing the reinforcement structure). Each of the plies includes fabric reinforcement (e.g., reinforcing fibers) and a curable resin that is impregnated into the fabric reinforcement. The reinforcement structure-forming material may be positioned overlying (e.g., on and/or over) the first flexible bladder, for example, by laying up the flexible plies onto the first flexible bladder. During layup, the plies may already include the curable resin (e.g., prepreg plies), or alternatively, the curable resin may be subsequently impregnated into the fabric reinforcement, for example, via an infusion process or the like. As used herein, the term "prepreg ply" refers to a layer of reinforcing fibers pre-impregnated with a resin that is uncured or partially cured (B-staged) but that is not fully cured.

A pressure differential is then produced between inside and outside of the first flexible bladder (e.g., via a vacuum bagging process or the like) such that the first flexible bladder applies a force (e.g., compressive force) to the reinforcement structure-forming material in a direction opposite the first rigid mandrel. Without being limited by theory, in an exemplary embodiment, it is believed that applying the force to the reinforcement structure-forming material while it is flexible and not yet fully cured, helps to compact and/or densify the material for improved mechanical and/or physical properties (e.g., rigidity such as relatively high strength and stiffness) and further, to accurately hold the material to its intended predefined shape (e.g., inner-most layer (IML) and/or outer-most layer (OML) shape) during fabrication of the reinforcement structure. In an exemplary embodiment, while the force is being exerted on the reinforcement structure-forming material, heat is also applied to cure or harden the curable resin, thereby forming a relatively rigid, hardened fiber reinforced composite as the reinforcement structure-forming material in a cured condition.

In an exemplary embodiment, the apparatus includes a plurality of additional flexible bladders correspondingly disposed about additional rigid mandrels that are similarly configured to the first flexible bladder and the first rigid mandrel. The flexible bladders, which are supported by the rigid mandrels, are arranged in a juxtaposed manner with the reinforcement structure-forming material disposed between some or all of the flexible bladders to support the material in the uncured condition in its intended predefined shape for forming the reinforcement structure. As such, when a pressure differential is produced with respect to inside and outside the flexible bladders, the flexible bladders simultaneously apply corresponding forces to compress the reinforcement structure-forming material during curing of the curable resin to form the reinforcement structure as a relatively rigid, hardened fiber reinforced composite structure.

In an exemplary embodiment, the predefined shape of the reinforcement structure-forming material correspondingly results in the reinforcement structure having an outer skin(s) and one or more internal features that are integrally bonded to the outer skin(s) via the cured resin of the hardened fiber reinforced composite structure without the use of any fixing devices (e.g., metal fasteners or the like). Additionally, in an exemplary embodiment, because the fiber reinforced composite material is relatively rigid and lightweight compared to metals, the reinforcement structure is relatively rigid and lightweight compared to conventional metal reinforcement structures.

FIGS. 1-8 illustrate a reinforcement structure 10 during various fabrication stages. The described process steps, procedures, and materials are to be considered only as exemplary embodiments designed to illustrate to one of ordinary skill in the art apparatuses and methods for making reinforcement structures; the apparatuses and methods for making reinforcement structures are not limited to these exemplary embodiments. Various steps in the manufacture of reinforcement structures are well known and so, in the interest of brevity, many conventional steps will only be mentioned briefly herein or will be omitted entirely without providing the well-known process details.

Figure 2:
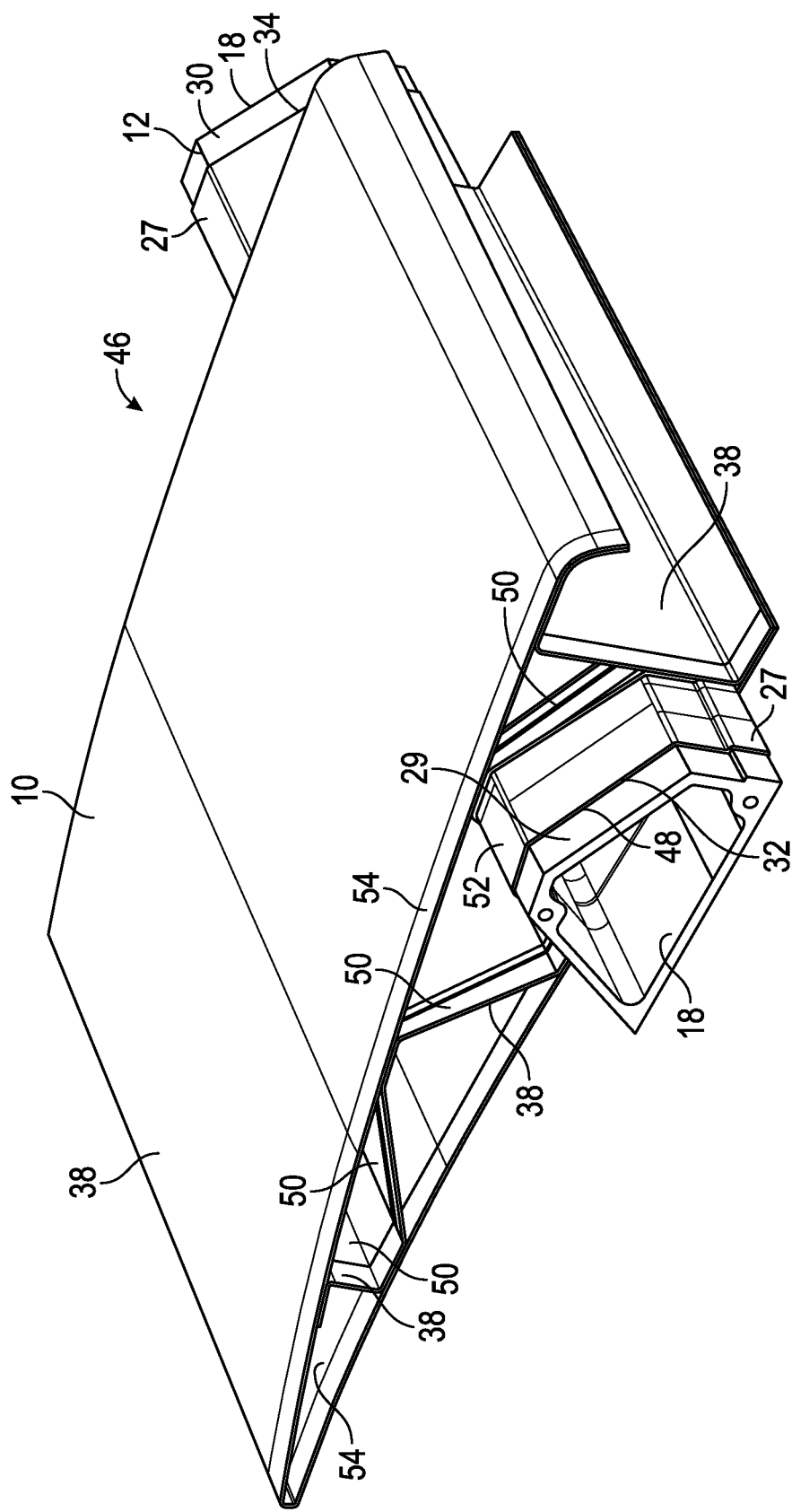

FIG. 1 illustrates, in perspective view, an apparatus 12 for making the reinforcement structure 10 during an intermediate fabrication stage in accordance with an exemplary embodiment. FIG. 2 illustrates, in perspective view, a portion of the apparatus 12 and the reinforcement structure 10 at a further advanced fabrication stage in accordance with an exemplary embodiment. As illustrated in FIGS. 1-2, the apparatus 12 includes a plurality of rigid mandrels 14, 15, 16, 17, 18, 19, and 20 and a plurality of flexible bladders 22, 23, 24, 25, 26, 27, and 28 (illustrated in FIG. 1 by dashed lines). In an exemplary embodiment, the rigid mandrels 14, 15, 16, 17, 18, 19, and 20 are elongated correspondingly extending from proximal end portions 29 to distal end portions 30.

The flexible bladders 22, 23, 24, 25, 26, 27, and 28 may be formed of a relatively flexible material, such as an elastomer, rubber, or the like, for example thermoplastic elastomer (TPE), thermoplastic urethane (TPU), polyvinyl chloride (PVC), thermoplastic olefin (TPO), or the like. The rigid mandrels 14, 15, 16, 17, 18, 19, and 20 may be formed of a relatively rigid material, such as metal, for example extruded aluminum or the like.

The flexible bladders 22, 23, 24, 25, 26, 27, and 28 correspondingly surround at least a portion of the rigid mandrels 14, 15, 16, 17, 18, 19, and 20 (e.g., more clearly illustrated in FIG. 2 with respect to flexible bladder 27 and rigid mandrel 18). In particular, in an exemplary embodiment, the flexible bladders 22, 23, 24, 25, 26, 27, and 28 surround and cover intermediate portions of the corresponding rigid mandrels 14, 15, 16, 17, 18, 19, and 20 that extend between the proximal end portions 29 to the distal end portions 30 such that the intermediate portions of the rigid mandrels 14, 15, 16, 17, 18, 19, and 20 are disposed inside the flexible bladders 22, 23, 24, 25, 26, 27, and 28. As such, each of the flexible bladders 22, 23, 24, 25, 26, 27, and 28 is at least partially supported by the intermediate portion of a corresponding one of the rigid mandrels 14, 15, 16, 17, 18, 19, and 20. In an exemplary embodiment, the flexible bladders 22, 23, 24, 25, 26, 27, and 28 have open ends 32 and 34 and the rigid mandrels 14, 15, 16, 17, 18, 19, and 20 extend from inside the flexible bladders 22, 23, 24, 25, 26, 27, and 28 through the open ends 32 and 34 to outside the flexible bladders 22, 23, 24, 25, 26, 27, and 28 such that the proximal and distal end portions 29 and 30 of the rigid mandrels 14, 15, 16, 17, 18, 19, and 20 are exposed.

Figure 3:
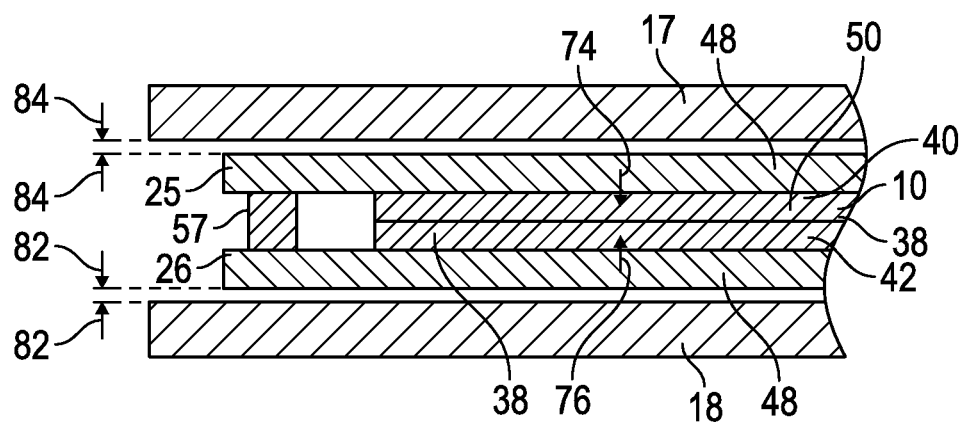
FIG. 3 is a sectional view of the apparatus depicted in FIG. 1 along line 3-3.
Figure 4:
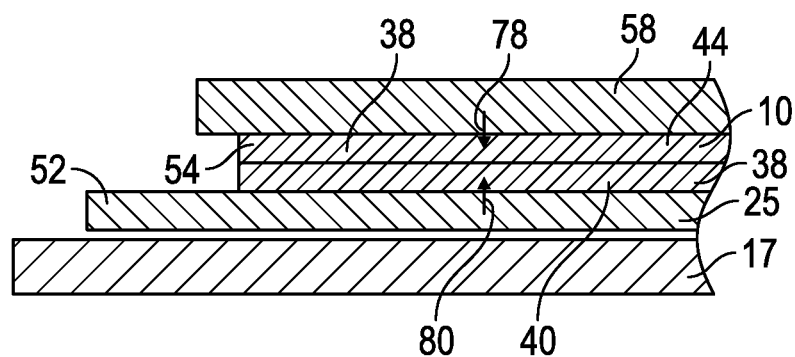
FIG. 4 is a sectional view of the apparatus depicted in FIG. 1 along line 4-4.

In an exemplary embodiment, the apparatus 12 includes a base table 36 on which the flexible bladders 22, 23, 24, 25, 26, 27, and 28 in combination with the rigid mandrels 14, 15, 16, 17, 18, 19, and 20 are arranged in a juxtaposed manner to define a predefined shape 46 for producing the reinforcement structure 10. Referring also to FIGS. 3-4, the reinforcement structure 10 is formed of a reinforcement structure-forming material 38 that is supported by the flexible bladders 22, 23, 24, 25, 26, 27, and 28. In an exemplary embodiment, the rigid mandrels 14, 15, 16, 17, 18, 19, and 20 provide rigid or solid support to the flexible bladders 22, 23, 24, 25, 26, 27, and 28 so that the flexible bladders 22, 23, 24, 25, 26, 27, and 28 can support the reinforcement structure-forming material 38 in or near the predefined shape 46 during fabrication of the reinforcement structure 10.

In particular and as will be discussed in further detail below, in an exemplary embodiment, the reinforcement structure-forming material 38 is formed of a plurality of plies 40, 42, and 44 that are arranged together (e.g., stack or layup) to form the predefined shape 46. Each of the plies 40, 42, and 44 includes fabric reinforcement and a resin that is impregnated into the fabric reinforcement. Exemplary fabric reinforcements may include unidirectional fibers, cloth or woven fibers, nonwoven fibers, random fibers, braided fibers, continuous fibers, and/or discontinuous fibers. Non-limiting examples of reinforcing fibers include S-glass fibers, E-glass fibers, carbon fibers, ceramic fibers, metallic fibers, polymeric fibers, and the like. Non-limiting examples of resins include polymeric resins or precursors of polymeric resins, such as, for example, epoxies, polyurethanes and/or polyurethane precursors, polyesters and/or polyester precursors, and the like. Other reinforcing fibers and/or resins known to those skilled in the art of fiber reinforced composite materials may also be used.

When the resin is in an uncured condition (e.g., curable or uncured resin) as illustrated in FIG. 1, the reinforcement structure-forming material 38 is flexible and the flexible bladders, which are supported by the rigid mandrels, provide a stable or solid continuous support to hold the reinforcement structure-forming material 38 in or close to its intended predefined shape 46. As will be discussed in further detail below, when the resin is in a cured condition (e.g., cured resin) as illustrated in FIG. 2, the reinforcement structure-forming material 38 is a relatively rigid fiber reinforced composite in which the reinforcement structure 10 is configured in the predefined shape 46 as a rigid reinforced composite structure.

As illustrated, a portion of the plies 40 and 42 are positioned along generally vertical walls 48 of at least some of the flexible bladders 22, 23, 24, 25, 26, 27, and 28 and their corresponding rigid mandrels 14, 15, 16, 17, 18, 19, and 20 so that the predefined shape 46 for the reinforcement structure 10 includes internal features 50, such as ribs, spars, webs, or the like. In an exemplary embodiment, the generally vertical walls 48 include elongated and relatively flat sections to facilitate forming the internal features 50 as ribs, spars, webs, or the like having corresponding relatively elongated, flat sections. Likewise, a portion of the plies 40 and 44 are positioned along generally horizontal walls 52 of at least some of the flexible bladders 22, 23, 24, 25, 26, 27, and 28 and corresponding rigid mandrels 14, 15, 16, 17, 18, 19, and 20 so that the predefined shape 46 for the reinforcement structure 10 includes outer skins 54. As illustrated, the internal features 50 are coupled to and extend between the outer skins 54. In an exemplary embodiment, when the reinforcement structure-forming material 38 is in the cured condition as illustrated in FIG. 2, the internal features 50 are affixed to the outer skins 54 via the cured resin without the use of any fixing devices.

Figure 5:
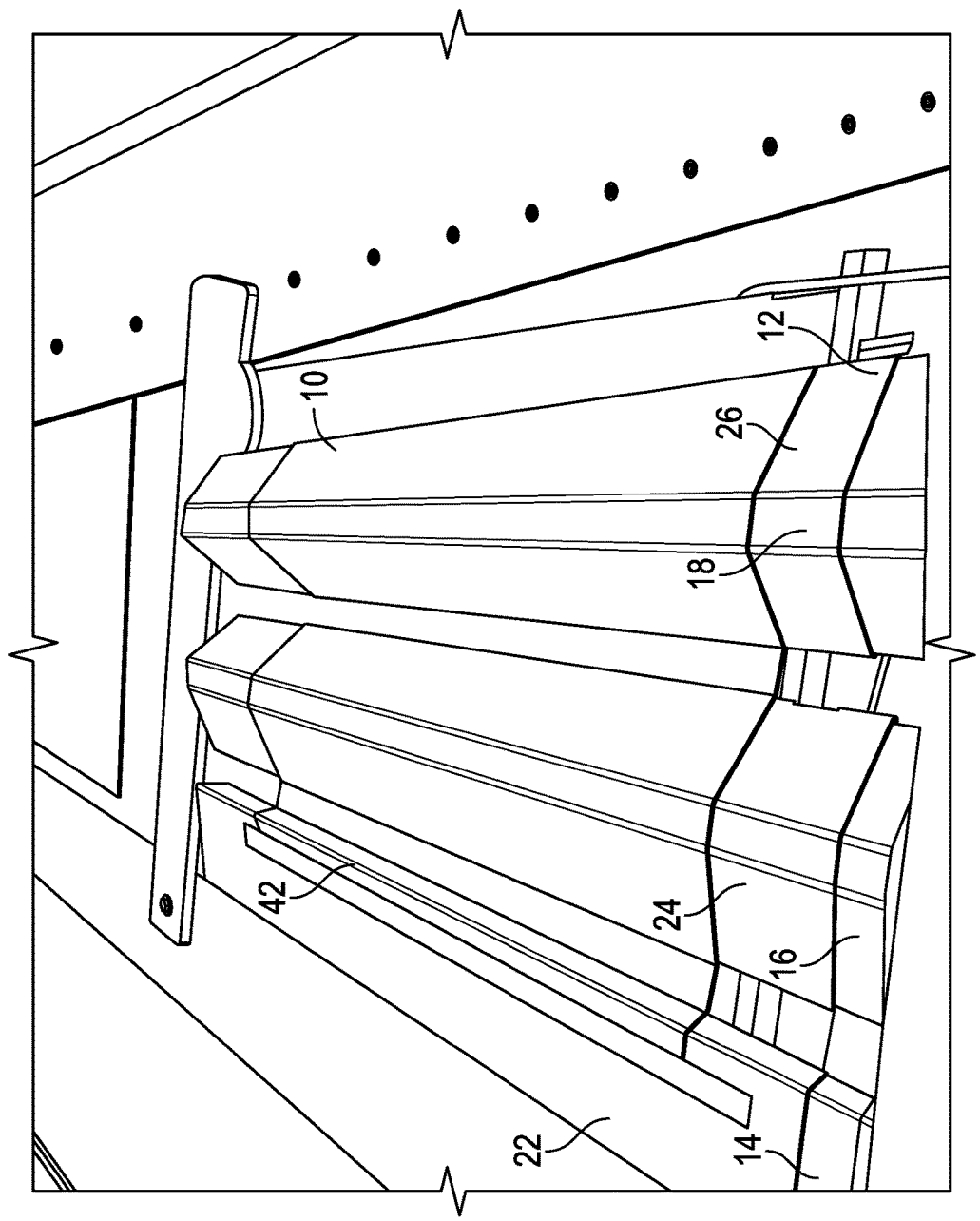

Referring to FIG. 5 with continuing reference to FIGS. 1-4, in an exemplary embodiment, the reinforcement structure 10 illustrated in FIG. 2 may be formed by arranging in a juxtaposed manner a first row of the flexible bladders 22, 24, and 26 with the corresponding rigid mandrels 14, 16, and 18 disposed inside the flexible bladders 22, 24, and 26 on the base table 36. A layup of one or more of the plies 42 is then arranged over and/or under the first row of the flexible bladders 22, 24, and 26.

Figure 6:
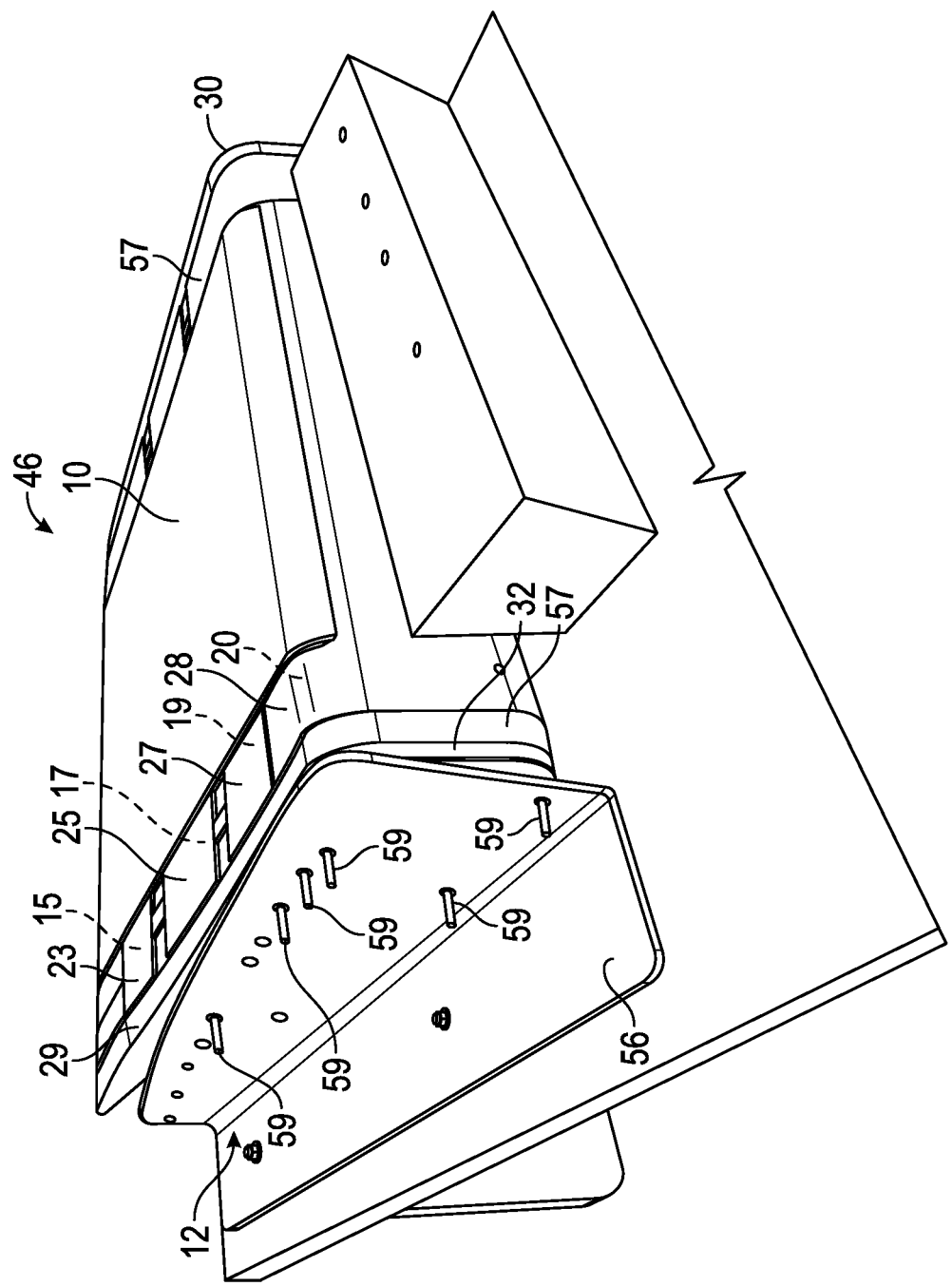

Next, the process continues as illustrated in FIG. 6 with continuing reference to FIGS. 1-5 by arranging in a juxtaposed manner a second row of the flexible bladders 23, 25, 27, and 28 with the corresponding rigid mandrels 15, 17, 19, and 20 disposed inside the flexible bladders 23, 25, 27, and 29 adjacent to (e.g., next to and/or overlying) the first row of the flexible bladders 22, 24, and 26. A layup of one or more plies 40 and/or 44 is then arranged over and/or around the second row of the flexible bladders 23, 25, 27, and 29. In an exemplary embodiment, the plies 40, 42, and 44 are prepreg plies that include the fabric reinforcement with the curable resin. In an alternative embodiment, the plies 40, 42, and 44 are formed of the fabric reinforcement and the curable resin is incorporated into the fabric reinforcement via a secondary process such as an infusion process, for example, a resin transfer process or the like.

As illustrated in FIG. 6, a positioning plate 56 may be arranged adjacent to the proximal and/or distal end portions 29 and 30 of the rigid mandrels 14, 15, 16, 17, 18, 19, and 20 to facilitate positioning the rigid mandrels 14, 15, 16, 17, 18, 19, and 20 and the flexible bladders 22, 23, 24, 25, 26, 27, and 28 to support the reinforcement structure-forming material 38 in the predefined shape 46. In an exemplary embodiment, locator pins 59 are coupled to the positioning plate(s) 56 and the rigid mandrels 14, 15, 16, 17, 18, 19, and 20 to facilitate maintaining the flexible bladders 22, 23, 24, 25, 26, 27, and 28 in position during fabrication of the reinforcement structure 10.

In an exemplary embodiment, tacky tape 57 is applied along the outer surfaces of the flexible bladders 22, 23, 24, 25, 26, 27, and 28 just inboard of the open ends 32 and 34 during and/or after laying up the plies 40, 42, and 44. As will be discussed in further detail below, the tacky tape 57 is used to form a seal around the outer surfaces of the flexible bladders 22, 23, 24, 25, 26, 27, and 28 to facilitate producing a pressure differential between inside and outside of the flexible bladders 22, 23, 24, 25, 26, 27, and 28.

Figure 7:
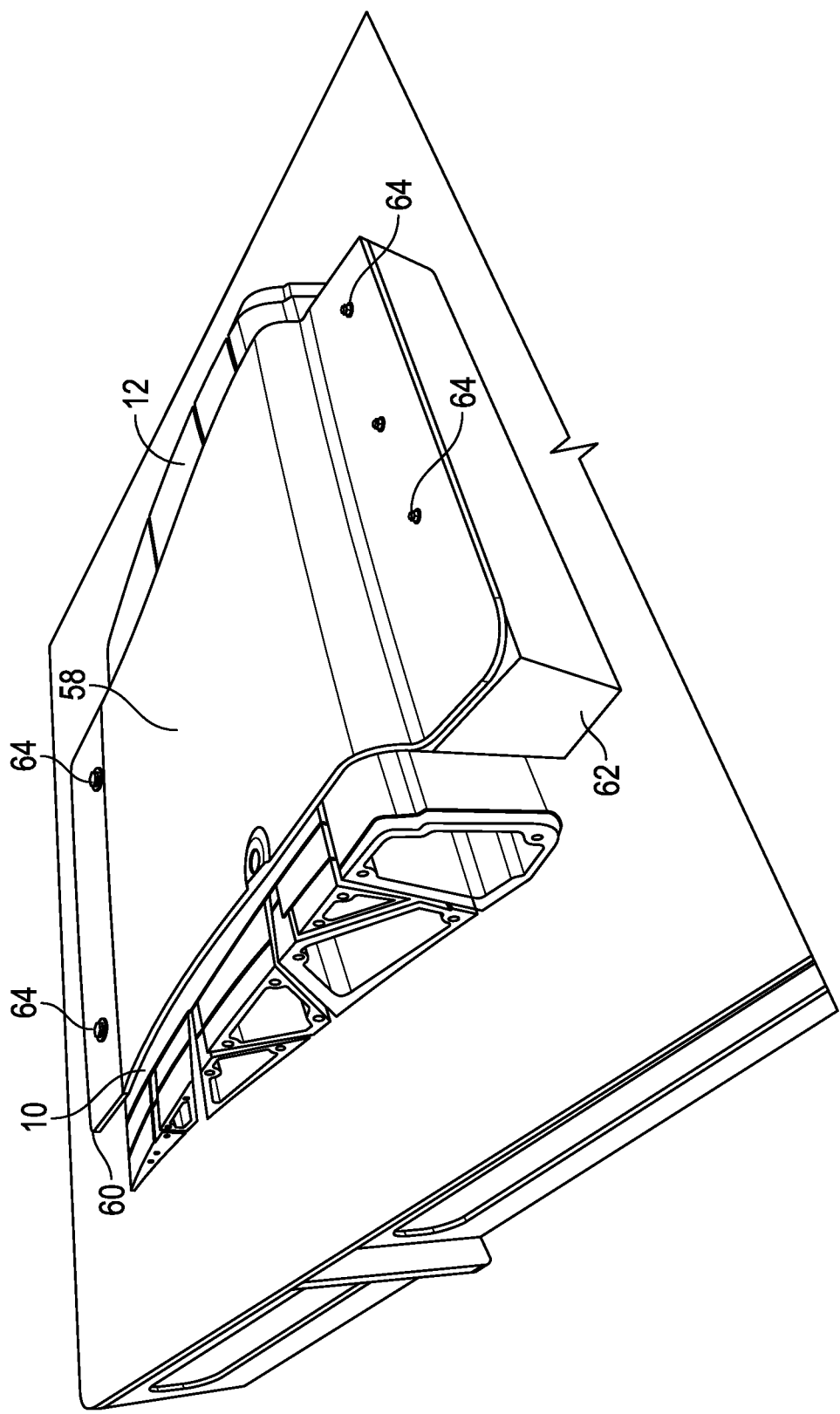

In an exemplary embodiment, the process continues as illustrated in FIGS. 6-7 with continuing reference to FIGS. 1-4 by positioning an outer surface plate 58 overlying the plies 40, 42, and 44, the flexible bladders 22, 23, 24, 25, 26, 27, and 28, and the rigid mandrels 14, 15, 16, 17, 18, 19, and 20 to define an outer surface profile for the predefined shape 46 corresponding to the outer skin 54 (see FIG. 2). As illustrated, the outer surface plate 58 is attached to positioning blocks 60 and 62 via threaded fasteners 64 to help hold the outer surface plate 58 in position during fabrication of the reinforcement structure 10.

Figure 8:
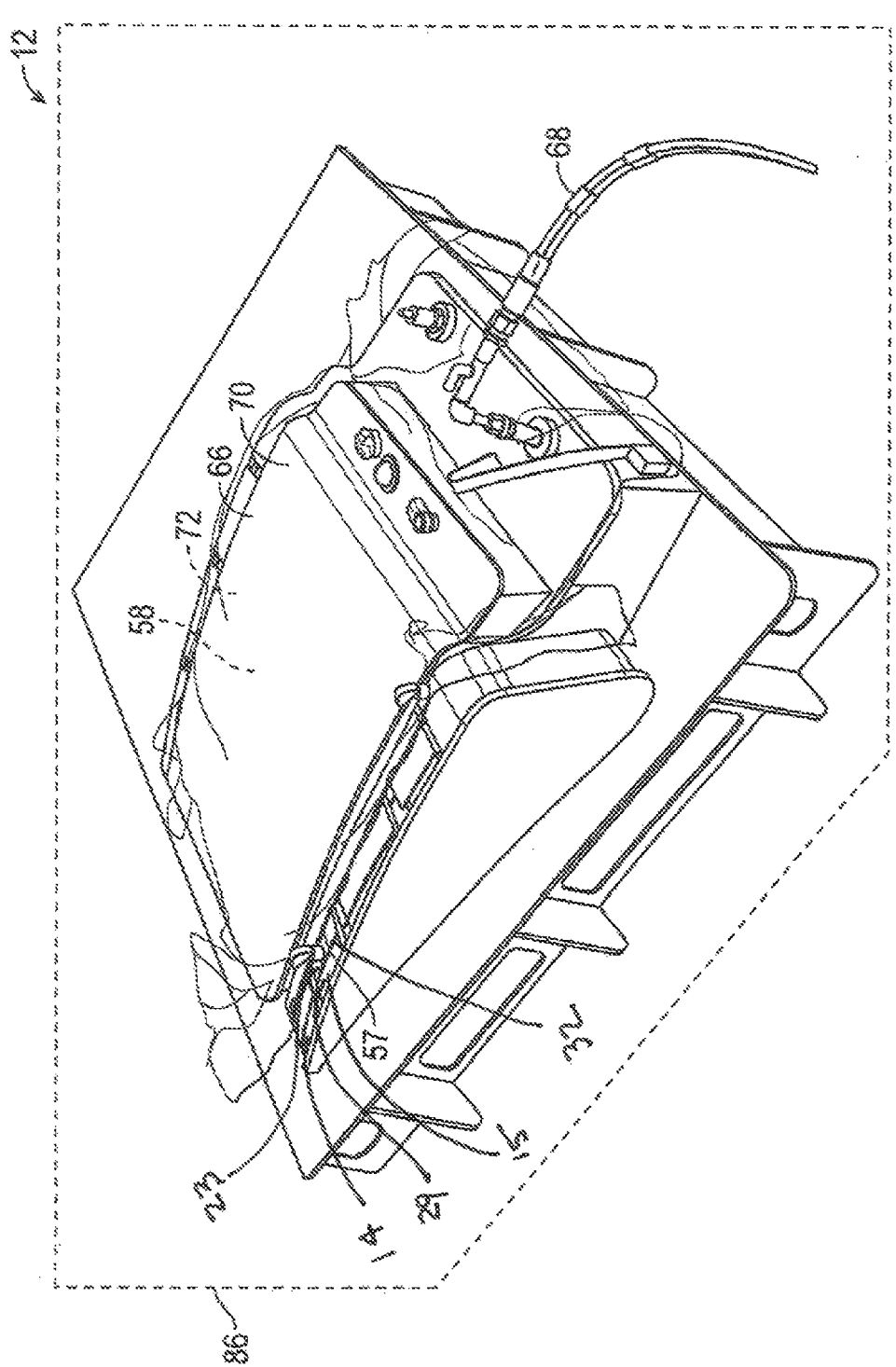

Referring to FIG. 8 with continuing reference to FIGS. 1-4 and 7, in an exemplary embodiment, the apparatus 12 includes a vacuum bag arrangement 66 that sealingly interfaces with the flexible bladders 22, 23, 24, 25, 26, 27, and 28 for producing a pressure differential between inside and outside the flexible bladders 22, 23, 24, 25, 26, 27, and 28. As illustrated, the vacuum bag arrangement 66 is arranged over the outer surface plate 58, the plies 40, 42, and 44, the flexible bladders 22, 23, 24, 25, 26, 27, and 28, and the rigid mandrels 14, 15, 16, 17, 18, 19, and 20. In an exemplary embodiment, the vacuum bag arrangement 66 includes a vacuum source 68, a vacuum bagging film 70, a breather fabric 72, and the tacky tape 57 (see also FIG. 6) as discussed above. In an exemplary embodiment, the vacuum bagging film 70 covers the breather fabric 72 and the tacky tape 57 forms a seal between the vacuum bagging film 70 and the outside surfaces of the flexible bladders 22, 23, 24, 25, 26, 27, and 28. The vacuum source 68 is operatively coupled to the vacuum bagging film 70 and is in fluid communication with the volume formed between the vacuum bagging film 70 and the outside surfaces of the flexible bladders 22, 23, 24, 25, 26, 27, and 28. The breather fabric 72 allows the vacuum source 68 to evacuate air from this volume without the vacuum bagging film 70 obstructing airflow to produce a vacuum condition immediately outside of the flexible bladders 22, 23, 24, 25, 26, 27, and 28 when the vacuum source 68 applies a vacuum. As discussed above, the open ends 32 and 34 of the flexible bladders are effectively sealed off from the vacuum bag arrangement 66 such that the insides of the flexible bladders 22, 23, 24, 25, 26, 27, and 28 are fluidly decoupled from the vacuum source 68. As such, when the vacuum source 68 applies a vacuum to the vacuum bag arrangement 66, a pressure differential between inside and outside the flexible bladders is produced by at least about the difference in pressure between the vacuum (e.g., about 0 to about 0.1 atm) from the vacuum source 68 and the ambient pressure outside of the vacuum bag arrangement 66 (e.g., about 1 atm at STP conditions).

As illustrated in FIGS. 3-4 and with continuing reference to FIGS. 1-2 and 8, in an exemplary embodiment, in response to the pressure differential between inside and outside of the flexible bladders 22, 23, 24, 25, 26, 27, and 28, the flexible bladders 22, 23, 24, 25, 26, 27, 28 advance from a nominal condition to a pressurized condition. In the pressurized condition, forces are applied to the reinforcement structure-forming material 38 commensurate with the pressure differential in corresponding directions (indicated by arrows 74, 76, 78, and 80) that are opposite the corresponding adjacent portions of the rigid mandrels 14, 15, 16, 17, 18, 19, and 20. In an exemplary embodiment, diametrically opposed forces 74, 76 and 78, 80 compress the reinforcement structure-forming material 38 to compact and/or densify the material 38 for improved mechanical and/or physical properties (e.g., rigidity) and further, to accurately hold the material 38 to its intended predefined shape 46 to facilitate forming the internal features 50 and the outer skins 54.

In an exemplary embodiment, the flexible bladders 22, 23, 24, 25, 26, 27, and 28 in the nominal condition are sized nearly "net fit" to their corresponding rigid mandrels 14, 15, 16, 17, 18, 19, and 20 and only minimally inflate when advanced to the pressurized condition. As such, the outer surfaces of the flexible bladders 22, 23, 24, 25, 26, 27, and 28 are substantially spatially registered with the outer surfaces of the rigid mandrels 14, 15, 16, 17, 18, 19, and 20 in both the nominal and pressurized conditions. In an exemplary embodiment, the inner surfaces of the flexible bladders 22, 23, 24, 25, 26, 27, and 28 are spaced apart from the outer surfaces of their corresponding rigid mandrels 14, 15, 16, 17, 18, 19, and 20 a distance (indicated by arrows 82 and 84) of from about 0 to about 2 mm when in the nominal condition and of from about 0.001 to about 5 mm in the pressurized condition.

As illustrated in FIG. 8 and with continuing reference to FIGS. 1-2, the apparatus 12 may include a heating and/or pressurizing device 86. In an exemplary embodiment, the heating and/or pressurizing device 86 is an autoclave. In another embodiment, the heating and/or pressurizing device 86 is a heating device, such as, for example, an oven. In an exemplary embodiment, the heating and/or pressurizing device 86 provides heat to the reinforcement structure-forming material 38 while the flexible bladders 22, 23, 24, 25, 26, 27, and 28 are in the pressurized condition to cure or harden the curable resin to form the reinforcement structure 10 as illustrated in FIG. 2 as a relatively rigid, hardened fiber reinforced composite structure. Additionally, the heating and/or pressurizing device 86 can provide additional pressure to inside the flexible bladders 22, 23, 24, 25, 26, 27, and 28 to further increase the pressure differential between inside and outside of the flexible bladders 22, 23, 24, 25, 26, 27, and 28 to increase the applied force(s) to the reinforcement structure-forming material 38 during curing. In an exemplary embodiment, the heating and/or pressurizing device 86 heats the reinforcement structure-forming material 38 to a temperature of from about 50 to about 250° C. and pressurizes the inside of the flexible bladders 22, 23, 24, 25, 26, 27, and 28 to a pressure of from about 1.5 to about 10 atm.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An apparatus for making a reinforcement structure, the apparatus comprising:
    a first rigid mandrel; and
    a first flexible bladder at least partially surrounding the first rigid mandrel for supporting a reinforcement structure-forming material during fabrication of the reinforcement structure, wherein the first flexible bladder is configured to apply a force to the reinforcement structure-forming material in a direction opposite the first rigid mandrel in response to a pressure differential between inside and outside of the first flexible bladder, wherein the apparatus further comprises a heating and/or pressurizing device configured for heating and curing of the reinforcement structure-forming material, wherein the first flexible bladder has an open end and the first rigid mandrel is disposed inside of the first flexible bladder and extends therefrom through the open end during both the pressure differential and curing of the reinforcement structure-forming material in the heating and/or pressurizing device with a portion of the first rigid mandrel disposed outside the first flexible bladder, wherein the first flexible bladder is configured to inflate from a nominal condition to a pressurized condition in response to the pressure differential, wherein the first flexible bladder in the nominal condition is sized nearly net fit to the first rigid mandrel, and wherein in the pressurized condition a first inner bladder surface of the first flexible bladder is spaced apart from a first outer mandrel surface of the first rigid mandrel a distance of from about 0.001 to about 5 mm during both the pressure differential and curing of the reinforcement structure-forming material.

2. The apparatus of claim 1, wherein the first outer bladder surface is substantially spatially registered with the first outer mandrel surface.

3. The apparatus of claim 1, wherein when the first flexible bladder is in the nominal condition, the first inner bladder surface is spaced apart from the first outer mandrel surface a distance of from about 0 to about 2 mm.

4. The apparatus of claim 1, further comprising:
    a plurality of rigid mandrels comprising the first rigid mandrel and a second rigid mandrel; and
    a plurality of flexible bladders comprising the first flexible bladder and a second flexible bladder that at least partially surrounds the second rigid mandrel for supporting the reinforcement structure-forming material during fabrication of the reinforcement structure, wherein the second flexible bladder is configured to apply an additional force to the reinforcement structure-forming material in a corresponding direction that is opposite the second rigid mandrel in response to a corresponding pressure differential between inside and outside of the second flexible bladder.

5. The apparatus of claim 4, wherein the first flexible bladder and the second flexible bladder are cooperatively configured to be positioned adjacent to each other such that the reinforcement structure-forming material is compressed by the first and second flexible bladders when the force and the additional force from the first and second flexible bladders, respectively, are applied to facilitate forming an internal feature of the reinforcement structure.

6. The apparatus of claim 5, wherein the first flexible bladder and the second flexible bladder each have a corresponding elongated flat surface for compressing the reinforcement structure-forming material to facilitate forming the internal feature of the reinforcement structure configured as a web, a rib, or a spar.

7. The apparatus of claim 1, further comprising a positioning plate that positions the first rigid mandrel to support the reinforcement structure-forming material during fabrication of the reinforcement structure.

8. The apparatus of claim 7, further comprising one or more locator pins for coupling with the positioning plate and the first rigid mandrel to facilitate positioning the first rigid mandrel.

9. The apparatus of claim 1, further comprising an outer surface plate configured to be positioned adjacent to the first flexible bladder such that the reinforcement structure-forming material is compressed by the first flexible bladder and the outer surface plate when the force from the first flexible bladder is applied to facilitate forming an outer skin of the reinforcement structure.

10. The apparatus of claim 1, further comprising a vacuum bag arrangement configured to sealingly interface with the first flexible bladder and for at least partially producing the pressure differential.

11. A method for making a reinforcement structure, the method comprising the steps of:
supporting a reinforcement structure-forming material with a first flexible bladder that at least partially surrounds a first rigid mandrel;
producing a pressure differential between inside and outside of the first flexible bladder such that the first flexible bladder applies a force to the reinforcement structure-forming material in a direction opposite the first rigid mandrel, wherein the first flexible bladder has an open end and the first rigid mandrel extends from inside the first flexible bladder through the open end such that a portion of the first rigid mandrel is disposed outside the first flexible bladder during producing the pressure differential, wherein the reinforcement structure-forming material comprises a fabric reinforcement and a resin; and curing the reinforcement structure-forming material while the first rigid mandrel is disposed inside of the first flexible bladder and extends therefrom through the open end with the portion of the first rigid mandrel disposed outside the first flexible bladder and the first flexible bladder applies the force to the reinforcement structure-forming material, wherein the first flexible bladder inflates from a nominal condition to a pressurized condition in response to the pressure differential, wherein the first flexible bladder in the nominal condition is sized nearly net fit to the first rigid mandrel, and wherein in the pressurized condition a first inner bladder surface of the first flexible bladder is spaced apart from a first outer mandrel surface of the first rigid mandrel a distance of from about 0.001 to about 5 mm during both the pressure differential and curing of the reinforcement structure-forming material.

12. The method of claim 11, wherein the reinforcement structure-forming material comprises a plurality of plies that each comprise a fabric reinforcement, and wherein supporting the reinforcement structure-forming material comprises laying up one or more of the plies overlying the first flexible bladder.

13. The method of claim 11, wherein the reinforcement structure-forming material comprises a fabric reinforcement and a resin.

14. The method of claim 11, wherein producing the pressure differential comprises producing a vacuum condition outside of the first flexible bladder using a vacuum bag arrangement.

15. The method of claim 14, wherein producing the pressure differential comprises pressurizing inside the first flexible bladder using an autoclave.

16. The method of claim 11, further comprising the step of:
positioning an outer surface plate such that the reinforcement structure-forming material is between the first flexible bladder and the outer surface plate, and wherein producing the pressure differential comprises compressing the reinforcement structure-forming material with the first flexible bladder and the outer surface plate to facilitate forming an outer skin of the reinforcement structure.

17. The method of claim 11, further comprising the step of:
positioning the reinforcement structure-forming material between the first flexible bladder and a second flexible bladder that at least partially surrounds a second rigid mandrel, and wherein producing the vacuum condition comprises producing the vacuum condition outside of the first and second flexible bladders such that the first and second flexible bladders compress the reinforcement structure-forming material to facilitate forming an internal feature of the reinforcement structure.

* * * * *